US007366555B2

(12) United States Patent
Jokinen et al.

(10) Patent No.: US 7,366,555 B2
(45) Date of Patent: Apr. 29, 2008

(54) MOBILE STATION ENCLOSURE

(75) Inventors: Tapani Jokinen, Helsinki (FI); Michael Mckay, Woodland Hills, CA (US)

(73) Assignee: Nokia Corporation (FI)

( * ) Notice: Subject to any disclaimer, the term of this patent is extended or adjusted under 35 U.S.C. 154(b) by 902 days.

(21) Appl. No.: 10/260,177

(22) Filed: Sep. 30, 2002

(65) Prior Publication Data
US 2004/0198247 A1 Oct. 7, 2004

(51) Int. Cl.
*H04M 1/00* (2006.01)
(52) U.S. Cl. .............................. 455/575.8; 455/550.1; 455/575.1; 455/575.3
(58) Field of Classification Search ............. 455/414.1, 455/550.1, 575.1, 575.3, 575.4, 575.8, 95, 455/100, 347, 348, 351
See application file for complete search history.

(56) References Cited

U.S. PATENT DOCUMENTS

| 5,995,025 | A | * | 11/1999 | Sternglass et al. ............ 341/22 |
| 5,999,821 | A | * | 12/1999 | Kaschke .................. 455/575.1 |
| 6,088,240 | A | * | 7/2000 | Steinhoff et al. ............ 361/814 |
| 6,104,916 | A | * | 8/2000 | Steinhoff et al. ......... 455/575.3 |
| 6,183,157 | B1 | * | 2/2001 | Brown et al. .................. 402/79 |
| 6,230,028 | B1 | * | 5/2001 | Shirakawa .................. 455/566 |
| 6,397,078 | B1 | * | 5/2002 | Kim ......................... 455/556.2 |
| 6,510,325 | B1 | * | 1/2003 | Mack et al. ............. 455/575.2 |
| 6,683,950 | B1 | * | 1/2004 | Harwood et al. ...... 379/413.02 |
| 6,731,753 | B2 | * | 5/2004 | Park et al. ............. 379/433.07 |
| 6,754,507 | B2 | * | 6/2004 | Takagi ..................... 455/550.1 |
| 6,766,181 | B1 | * | 7/2004 | Newman et al. ......... 455/575.3 |
| 6,914,982 | B2 | * | 7/2005 | Toyoda et al. ......... 379/433.13 |

* cited by examiner

*Primary Examiner*—Tony T. Nguyen
(74) *Attorney, Agent, or Firm*—Alston & Bird LLP

(57) ABSTRACT

An enclosure for a mobile station such as a cellular telephone. The enclosure has a front cover and a back cover integrally formed with a living hinge, which may itself function as an end cover. The front and back covers rotate away from each other about the living hinge sufficiently to allow the mobile station internal assembly to be placed between them and, when it is thus disposed, rotate back together into a closed configuration where they can be secured together to prevent accidental opening. An end cover may also be formed by an intermediate cover portion, which may itself be connected to the front and back covers by living hinges.

25 Claims, 15 Drawing Sheets

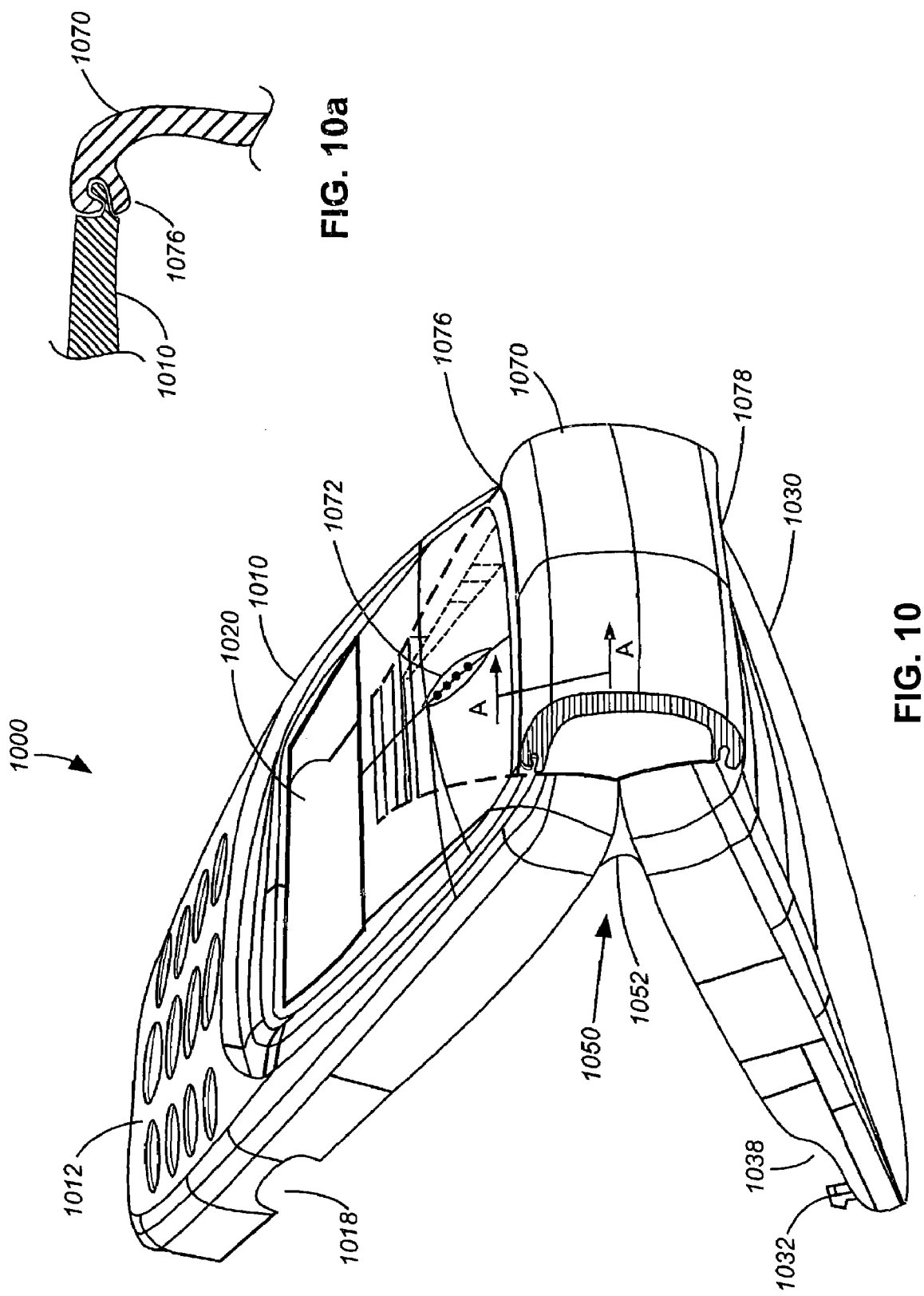

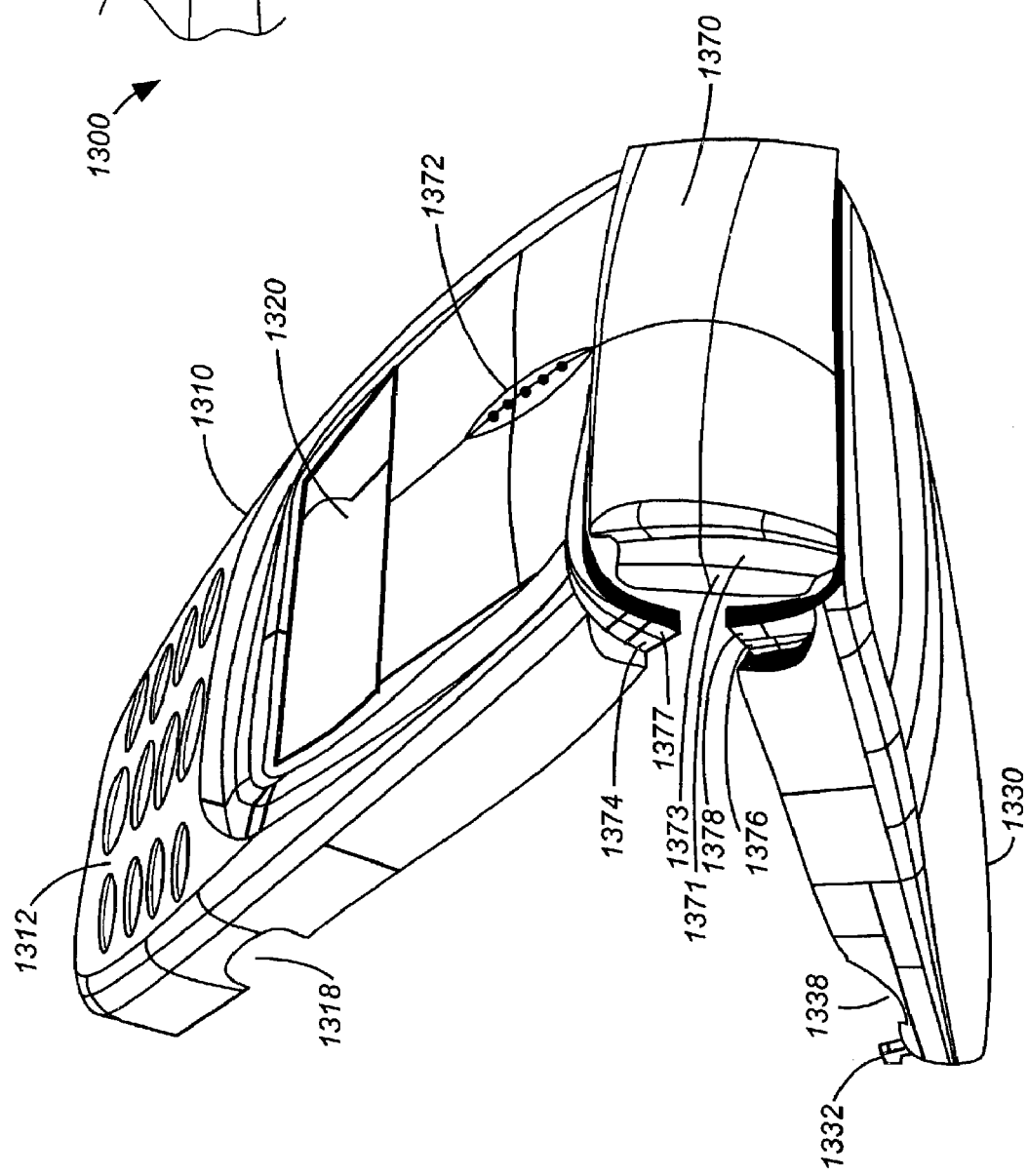
FIG. 13
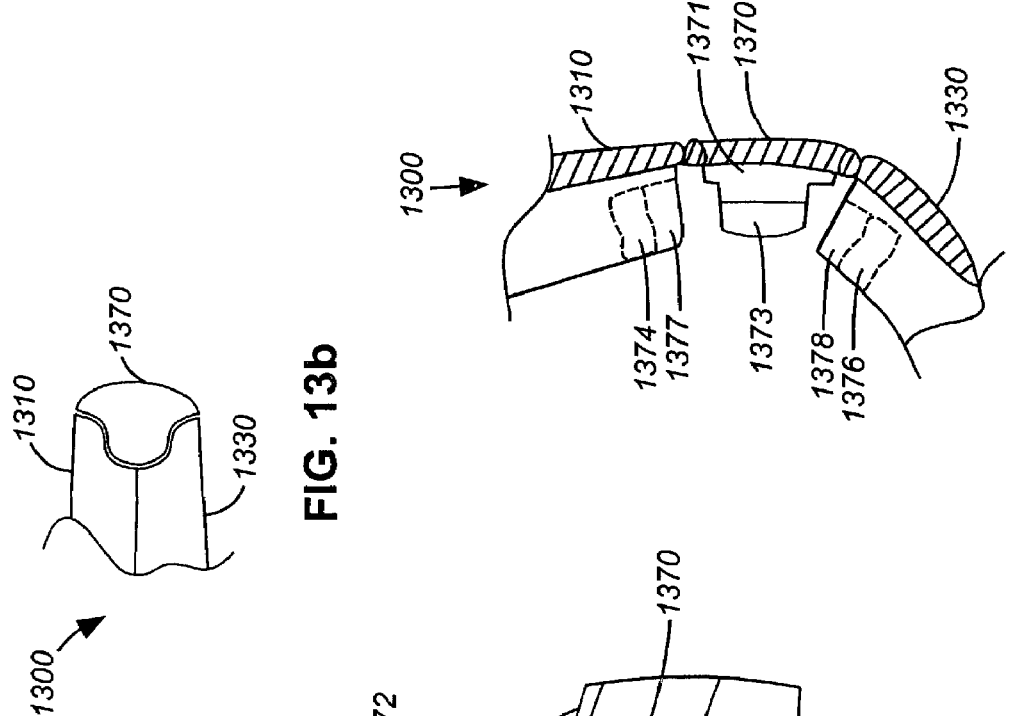
FIG. 13a
FIG. 13b

MOBILE STATION ENCLOSURE

The present invention relates generally to mobile-station design, and more specifically to a mobile-station enclosure having a living hinge design to facilitate convenient installation and removal and reduce the costs of mobile-station manufacturing.

BACKGROUND OF THE INVENTION

Mobile stations are portable electronic devices useful for a variety of applications. Many mobile stations are cellular telephones, which are basically telephone handsets equipped with transmitter and receiver circuitry useful for communicating with one or more base stations that are, in turn, connected to a telecommunications network. Some such devices are also capable of performing auxiliary functions—some related to their functions as telephones and some not. For example, the mobile station may include a stored directory of telephone numbers and addresses that have been entered by the user. A mobile station may also have an appointment-calendar application, complete with alarms that sound when an appointment approaches. Mobile stations may also have games that the user may play simply to pass the time. Some mobile stations are even web-enabled, meaning that generally they may be used to find, access, and even interact with World Wide Web sites through a gateway between the telecommunications network and the Internet. Because of this widely-varying functionality, the term "cell phone" is less appropriate than the more general "mobile station", which will therefore be used herein. Note that unless explicitly stated, the mobile station is not required to perform any one particular function or set of functions.

Traditional mobile-station design has centered on utility. Even when mobile stations were simply cell phones, they were often large and bulky. The internal components needed just to place and receive calls had not achieved anything near the level of miniaturization that they exhibit today. The same is true of the batteries on which the device is operated, which often had to be carried separately unless the phone was permanently installed in an automobile. Aesthetic considerations were given little emphasis, and in any event only a very small variety of designs existed because few consumers could afford to buy and operate the phone. With the advent of smaller and less expensive devices, and the parallel reduction in operating costs, however, mobile phones became more popular. Their increased popularity not only encouraged further advances in technology, but also created a great demand for instruments that were also more convenient to use and attractive in appearance. The presently enormous mobile-station market allows for a wide variety of designs, and consumers may choose the one most suitable for them.

FIG. 1 is an exterior isometric view of a typical mobile station, in this case a mobile phone 100, according to the prior art. Mobile phone 100 is a radio telecommunication device for use in a cellular communication network. It contains a radio transmitter and receiver (not shown) for sending transmissions to nearby base stations that are in turn connected with the main network. The network itself naturally provides for intra-network communication, and also includes gateways through which other networks, such as the public-switched telephone network (PSTN) and the Internet may be accessed. Mobile station 100 is most often used for real-time voice communication, but can be used for short-message-system (SMS) messaging, data transmission, Web surfing, and paging services as well.

The internal circuitry and components (not shown in FIG. 1) of mobile phone 100 are contained in a casing, or enclosure, that typically includes two or more sections, which will sometimes herein be referred to as covers. Referring to FIG. 1, mobile phone 100 has an enclosure 101 that includes front cover 120 and back cover 122, which are removably fastened together at joint 105 when the phone is assembled. Front cover 120 and back cover 122 are not ordinarily taken apart except for maintenance by a service technician. Front cover 120 and back cover 122 are normally made of a hard plastic material, such as polycarbonate/ABS (PC/ABS). This material is strong enough to protect the telephone internals from reasonable shock encountered in ordinary operation and to resist penetration by objects that it may encounter when placed in a user's pocket, purse, or briefcase. Unfortunately, more severe shocks may result in fracturing the cover, and some strain will be transferred to the phone's internal components if caused by a strong enough force, such as when the phone is dropped.

Several openings are formed in enclosure 101 of mobile phone 100, with most, though not necessarily all of them present in front cover 120. The keypad 110 on face 106 of front cover 120 is a user interface including a plurality of openings, through which protrude keys such as alphanumeric keys 112, call control keys 114, scroll key 115 and function keys 116. As their names imply, these keys perform various duties in the phone's operation, with the alphanumeric keys 112 having a standard telephone keypad role, and the function and scroll keys used in conjunction with display 134. That is, the function of the function and scroll keys are variable and determined by the application state that the mobile phone is in, which is translated into a word or icon displayed next to the respective key on display 134.

Display 134 is typically a liquid crystal display (LCD) device. The LCD itself is protected by a plastic window pane 132, which is mounted to cover the display and protrude into window 130, an opening formed in front cover 120. As illustrated in FIG. 1, display 134 presents to the user such information as current function-key functions, telephone numbers, signal strength, and other information useful to the operation being performed. The protective window pane 132 is typically a component separate from the LCD, its chassis, and other portions of the internal assembly. Window pane 132 is necessary because the components making up the LCD are fragile and subject to damage from even mild strikes.

Also formed in face 106 of front cover 120 is a small opening for power switch 118 and a plurality of small openings 142 that serve as a port for the speaker (not shown), which is mounted beneath them. At the opposite end of mobile station 100, microphone port 144 likewise permits entry of sound directed at the actual microphone (not shown) mounted inside. In the embodiment of FIG. 1, microphone port 144 is formed in the side of front cover 120, but could be formed anywhere proximate to the expected voice source, for example among alphanumeric keys 112 or on the bottom end 107 of front cover 120.

Located in the end 107 of front cover 120 are power port 146 for plugging in an external power adaptor and external-device port 148 for connecting an external headset and perhaps a microphone for hands-free operation. Power port 146 and external-device port 148 are receptacles for connecting (plugging in) an external appliance to the internal circuitry of mobile station 100. These receptacles are mounted within the mobile station's internal assembly (not shown) and are accessible from the outside through openings formed in end 107 of front cover 120. Note in this context that as used herein, the term "port" may refer to either a mere opening in the cover or an electrical connection mounted in an opening, with the distinction between these two types of port made only when necessary.

Back cover 122 frequently forms a recess (not shown) for receiving battery 124, to which it is removably attached during operation. In alternate versions, the battery may be received into an internal battery compartment and enclosed by the back cover or inserted into an opening in the back cover and protected or held in place by a separate battery cover. Also shown on back cover 122 is volume control 117, which, like the other keys, is accomplished by a key member protruding through an opening formed in the cover, in this case, back cover 122, that when manipulated by the user activates a switch located on the inner telephone assembly (not shown). Finally, radio transmission by the mobile station 100 shown in FIG. 1 is accomplished through use of antenna 126.

More recent designs permit some customization. As mentioned above, the popularity widespread use of mobile stations-especially as mobile phone has allowed vendors to offer a wide variety of designs from which consumers may choose. In addition, some vendors offer mobile stations that may be altered in appearance to permit the user not only to select the design most pleasing to them, but also to change the station's appearance from time to time to suit their mood or the occasion. One customization device is a case or clip that is used to carry and protect the instrument. Some cases are rather solid and bulky and do not permit operation of the station within them, while others form various windows, some of the windows being open and others being covered with a transparent material to permit the LCD to be viewed and the keys manipulated. Another customization device is what will herein be referred to as a "custom face cover".

FIG. 2 is an isometric view of a custom face cover 200 such as might be used with the mobile phone 100 of FIG. 1. Custom face cover 200 serves a basically aesthetic purpose, allowing the user to change the appearance of their mobile station by placing the cover 200 over the face 106 of mobile station 100. As can be seen in FIG. 2, a variety of openings are formed in the face 202 of cover 200 to a low for access to the features below. For example, a display opening 211 permits the display to be seen even with the cover 200 in place. Speaker opening 213 performs an analogous function with respect to the speaker of mobile station 100. Keypad openings, indicated generally at 215, allow user access to the keys.

Custom face cover 200 included side panels 204 and 206, and end panels 203 and 205. Side panel 204 forms a notch 221 for allowing sound to reach the microphone of mobile station 100, and end panel 203 forms notches 223 and 225 for access to power port 146 and external-device port 148. Together with face 202, the end panels and side panels form a recess into which the face 106 of mobile phone 100 may be received. Cover 200, after installation, is retained in place by its press-fit relationship to mobile phone 100, or by a series of structural extensions and corresponding grooves (not shown) that are engaged or disengaged as cover 200 flexes slightly during installation or removal, respectively.

While custom cover 200 certainly adds some protective quality, any improvement in this regard is small. In other words, its value is virtually limited to its aesthetic advantages. The mobile phone (shown in FIG. 1) is fully operable and adequately protected even without it. The custom cover is simply a customization accessory, and, of course, there is a basic limit to the extent of customization that may actually be performed in using it. Therefore, there remains a need for a mobile station that is easily customizable while providing adequate support and protection for internal components and, at the same time reducing the costs associated with manufacturing. The present invention provides just such a design.

SUMMARY OF THE INVENTION

In one aspect, the present invention is an enclosure for containing the internal assembly of a mobile station. The enclosure includes a front cover and a back cover connected to each other via a living hinge, about which the front and back cover may rotate from an open configuration for receiving the internal assembly to a closed configuration for containing it. The living hinge may be continuous or discontinuous, forming a plurality of living-hinge portions. The enclosure may further include an intermediate cover, which may be attached to either the front cover, or to the back cover, or to both. The intermediate cover may be attached using a snap connection or a living hinge, and may move with the front and back covers when they open and close, or it may be capable of independent movement to selectively provide access to certain areas of the internal assembly. When closed, the front, back, and intermediate covers may be held in the closed configuration by an internal or external snap assembly.

In another aspect, the present invention is a mobile station having an internal assembly and an enclosure for containing the internal assembly, the enclosure having a front cover and a back cover integrally formed with a living hinge. The enclosure front and back covers rotate about the living hinge in order to open for receiving the internal assembly and close for containing it. The mobile station may also include a keymat disposed within the enclosure in such a way that it provides an operational keypad for the mobile station. The mobile station may also include a keypad integrally formed in the front cover. A window pane may be added for additional protection of the display of the internal assembly.

BRIEF DESCRIPTION OF THE DRAWINGS

For a more complete understanding of the present invention, and the advantages thereof, reference is made to the following drawings in the detailed description below:

FIG. 10 is an isometric view of a mobile station enclosure according to a seventh embodiment of the present invention. FIG. 10a is a partial cross-section of the region where the front cover meets the closed intermediate cover, as taken along section line A-A in FIG. 10.

FIG. 13 is an isometric view of a mobile station enclosure according to a tenth embodiment of the present invention. FIG. 13a is a partial side view of the external snap assembly of the enclosure of FIG. 13, as viewed from the interior. FIG. 13b is a partial side view of the external snap assembly, shown as it appears when the enclosure of FIG. 13 is in the closed configuration.

DETAILED DESCRIPTION

FIGS. 3 through 15, discussed below, and the various embodiments used to describe the present invention are by way of illustration only, and should not be construed to limit the scope of the invention. Those skilled in the art will understand the principles of the present invention may be implemented in a variety of similar mobile station applications, in addition to the devices specifically discussed herein. That is, while the preferred embodiment of the present invention is an enclosure for enclosing a mobile telephone, such as a cell phone, it is equally suitable for other similar devices such as personal digital assistants (PDAs), Web-enabled phones, and the like. As mentioned above, for convenience such devices and those like them will herein be referred to generically as "mobile stations".

Whatever the mobile station's function, many of the electronic components for carrying it out will be formed in semiconductor chips that are mounted on a printed wire board (PWB). Microphones, speakers, and displays are added as appropriate to the device, as are keypads or other user-input mechanisms. Although designs may vary, in a typical mobile station, these components will be enclosed in, or mounted on, an internal chassis made up of what amounts to an interior front and back cover. Together, these internal components and the chassis may be referred to as the mobile station's "engine" or "internal assembly".

Figure 3A:
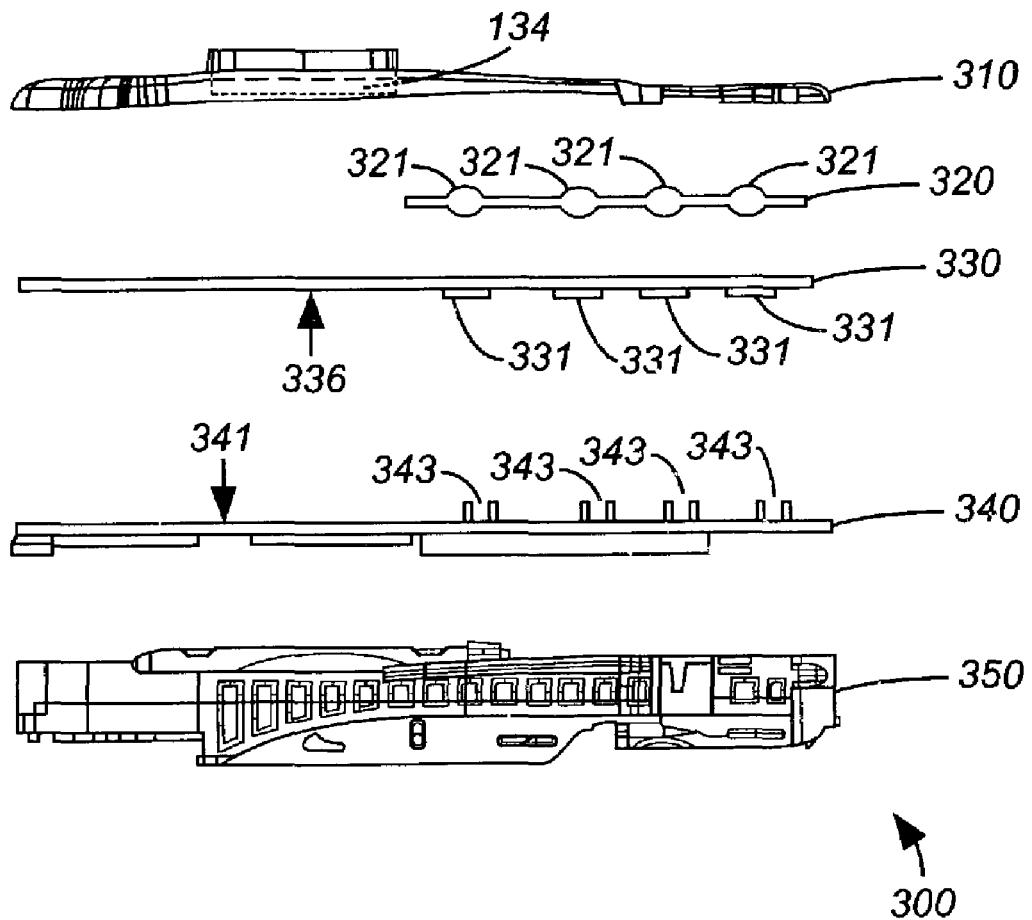
FIG. 3A is an exploded side view of a mobile station internal assembly such one that may be enclosed according to an embodiment of the present invention.

FIG. 3A is an exploded side view of an exemplary mobile station internal assembly 300, such as one that may be used in accordance with an embodiment of the present invention. Except where explicitly pointed out, there are no specific requirements for construction of the internal assembly; it is a general term used to refer to the mobile stations internals, which are substantially if not completely enclosed in accordance with practicing the present invention. In the illustrated embodiment, internal assembly 300 includes PWB 340, upon which is mounted various of the electrical components that perform the telecommunication functions of the mobile station. Mounted on the top 341 of PWB 340 will typically be found a plurality of switch-contact pairs 343 such that the switch is closed by a third contact coming into contact with both contacts of a switch-contact pair 343. For example, a number of such third contacts 331 are shown as mounted on the underside 336 of contact sheet 330. Contact sheet 330, in this embodiment, is constructed of a thin sheet of plastic or similar material, and not only retains contacts 331, but also acts as a barrier to keep dust, water droplets, and other deleterious foreign matter away from PWB 340. Typically, when in an assembled configuration PWB 340 and contact sheet 330 cooperate such that the switches formed by contacts 331 and the contact pairs 343 mounted on PWB 340 are normally open, and may be closed by application of a force driving them together. PWB 340 and contact sheet 330 are held in proper relation by chassis body 350 and chassis faceplate 310. Chassis body 350 may be configured so as to in effect contain PWB 340, and likely houses other mobile-station components as well, such as the mobile station's microphone and battery.

Figure 1:
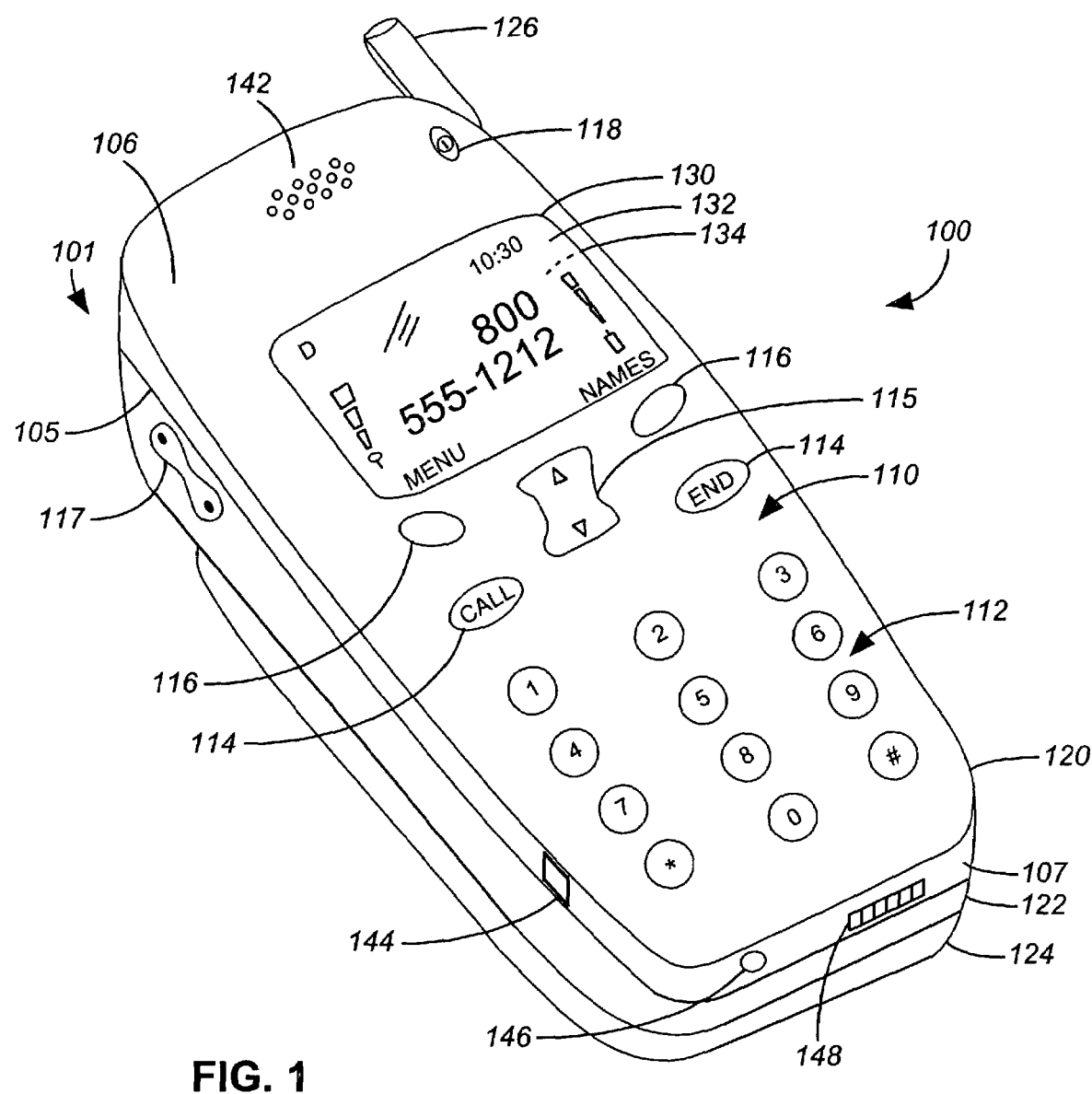
FIG. 1 is an isometric view of a traditional mobile station designed according to the prior art.

Optionally, a keymat 320 is generally disposed between the contact sheet 330 and chassis faceplate 310. Keymat 320 includes a plurality of integrally-formed keys 321. Each key 321 corresponds with a contact switch 331, which the key will activate when depressed by the user. Typically, the keys will rise sufficiently to protrude through openings (not shown) formed in chassis faceplate 310 for the purpose of receiving them, and through openings formed in the face of the mobile station (see, for example, the mobile phone 100 depicted in FIG. 1). The keymat 210 is referred to as optional, however, because there are other means of providing a user keypad, as will be discussed below.

The chassis body 350 is constructed of a relatively rigid material and contributes significantly to the mobile station's structural strength. Chassis faceplate 310 is also preferably constructed of a relatively rigid material and when the mobile station is assembled, it is fastened to chassis body 350 using a plurality of screws or some other fastening means (not shown). Chassis faceplate 310 will typically contain the speaker (not shown) and LCD 134 (approximate location shown by broken line). In a preferred embodiment, faceplate 310 and chassis body 350 are fastened together with PWB 340 and contact sheet 330 between them, although alternately they may simply be operably positioned with respect to each other and then installed into the enclosure depicted in FIG. 1.

Figure 3B:
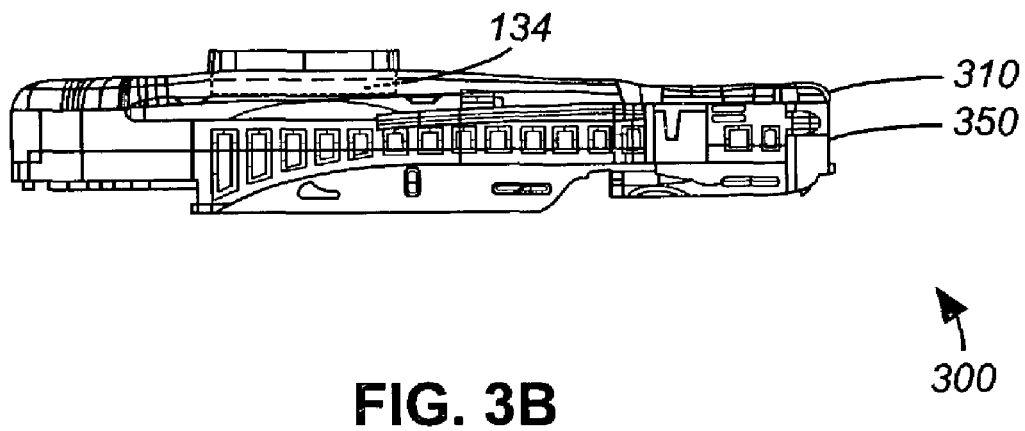
FIG. 3B is a side view of the internal assembly of FIG. 3A shown in an assembled configuration.

FIG. 3B is an illustration of the internal assembly 300 in its assembled configuration. Note that in this embodiment, the PWB 340 and the contact sheet 330 (shown in FIG. 3A) are safely enclosed between the faceplate 310 and the main chassis 350. Except for the battery, and perhaps the keypad, internal assembly 300 includes all or nearly all of the operational components of an operational mobile station. The various structural features formed about the exterior of internal assembly 300 and illustrated (though not enumerated) in FIGS. 3A and 3B may provide, for example, support for the internal components, structural stability, or simply help to fit the assembly into its protective enclosure, that is, an outer enclosure. The exact configuration of these features, however, is not relevant to the present invention except where explicitly noted. The mobile phone 100 of FIG. 1 may have, but does not require, an internal assembly 300 as shown in FIGS. 3A and 3B (or a similar internal assembly). As will be apparent, however, such an inner assembly is preferable for use with the enclosure of the present invention. That is, the inner assembly preferably securely contains all or nearly all of the components of the mobile station in a protective way, so that they can be easily transferred from enclosure to enclosure in order to customize the mobile station.

Figure 4:
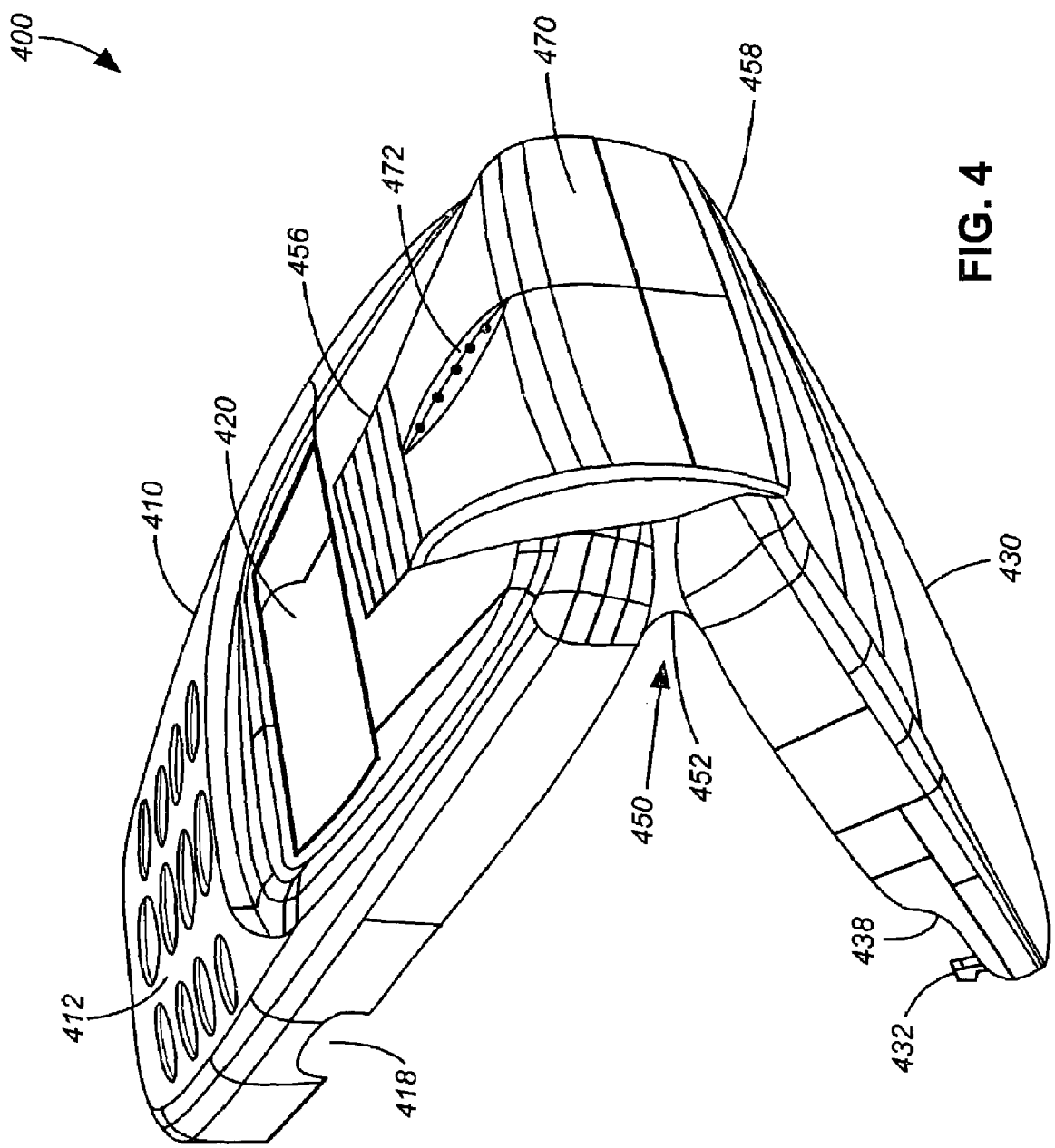
FIG. 4 is an isometric view of a mobile station enclosure according to one embodiment of the present invention.

The enclosure of the present invention, for example, enclosure 400 illustrated in FIG. 4, is an outer enclosure for substantially containing the internals of the mobile station, which are preferably assembled in the manner consistent with internal assembly 300 as shown in FIG. 3B. The enclosure is relatively easy and inexpensive to manufacture, and can be made available in a wide variety of designs. In general, this means that a user may purchase or be provided with any number of such enclosures for use in customizing the appearance of the phone and even for different applications. The enclosure is designed to be easy to install, that is, to open allowing the removal of the internal assembly, and close in such a way as to secure it when the mobile station is assembled.

Figure 2:
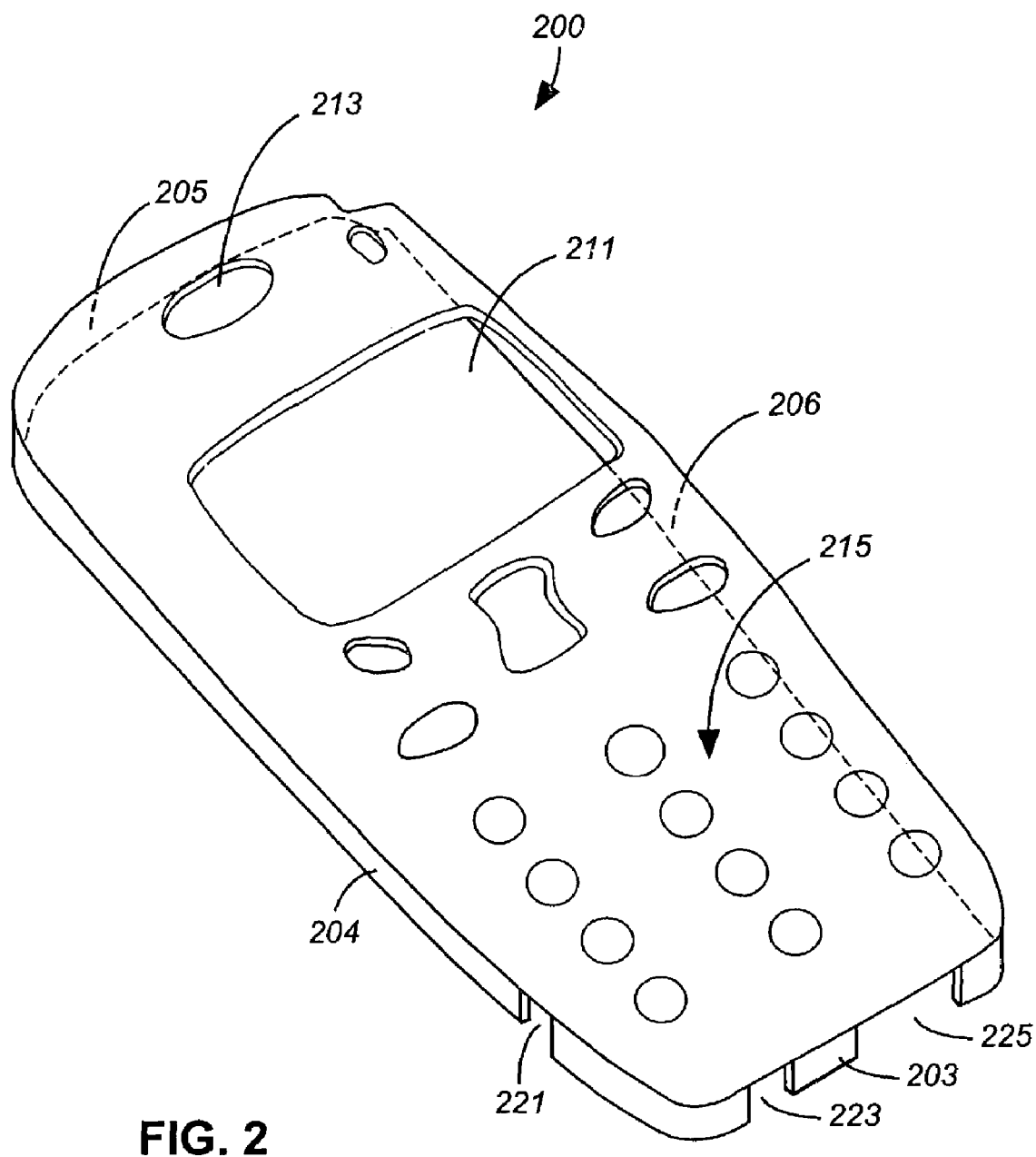
FIG. 2 is a custom cover for use with the mobile station of FIG. 1.

The enclosure of the present invention provides for relatively less expensive manufacture because its unitary construction saves tooling costs, and reduced tolerance stack-ups. That is, the enclosure does not have to be assembled from a large number of independently-fabricated components, each of which would have to have fairly precise dimensions required for such an assembly. In addition, contrary to the custom face covers, such as custom face cover 200 shown in FIG. 2, less precision of fit between the internal assembly and the enclosure is required. This also means that minor variations to the shape and size of various internal assemblies may not affect the user's ability to enclose them using previously acquired enclosures. Internal spacers could even be used to restrict undesirable shifting of an internal assembly smaller than the space provided for it. Finally, because the tolerance required for the enclosure of the present invention are not as exacting as in current applications, environmentally friendly-materials such as polypropylene and polyethylene may be used. The use of such material also provides the advantage of being able to integrate the keymat functionality into the enclosure where desired. (See, for example, the embodiment of FIG. 15.) The design of the enclosure of the present invention, as expressed in a variety of embodiments, will now be examined in more detail.

FIG. 4 is an isometric view of a mobile station enclosure 400 according to one embodiment of the present invention. The enclosure 400 includes a front cover 410 and a back cover 430. The front cover and the back cover are integrally formed with a "living hinge" 450. Living hinge 450 includes a first portion 452, and a corresponding second portion (not shown in FIG. 4). Front cover 410 and back cover 430, during mobile-station assembly, pivot about living hinge 450 to operate between an open configuration (as shown in FIG. 4) and a closed configuration (not shown). As should be apparent, when an internal assembly, for example, internal assembly 300 shown in FIGS. 3A and 3B, is placed between front cover 410 and back cover 430 while they are separated in an open configuration, the covers may then be closed to form an outer enclosure for the mobile station. In this embodiment, front cover 410 forms a plurality of openings 412 through which the various keys of the keypad (not shown) associated with the mobile station may protrude so as to be made accessible to the user. A window 420 is also formed in front cover 410, through which user may view the LCD or other display associated with the mobile station. In an alternate embodiment (not shown), a separate window pane may be placed above the LCD for added protection. And although the enclosure 400 is not routinely made of a transparent material, if it is, then open window 420 may be eliminated in favor of a integrally-formed portion of the structure through which the LCD remains visible.

Returning to the embodiment of FIG. 4, an locking extension 432 is integrally formed with back portion 430 and extends to be received in a corresponding receptacle (not shown) in front cover 410 when the enclosure is operated into a closed configuration. Although not shown, a second locking extension would likely be formed near the lower left-hand corner of the enclosure for the same purpose, that is, to prevent accidental opening of the enclosure 400. Extending between front cover 410 and back cover 430 is an intermediate cover portion 470 that is integrally formed with the front cover and joined at living hinge 456. Intermediate cover 470 is also joined to back cover at living hinge 458. The intermediate cover forms a series of openings 472 that allows the user to hear the speaker (not shown) at the mobile station. A recess 418 formed in front cover 410 correspondences with a recess 438 formed in back cover 430, similarly providing access to a microphone (also not shown) of the mobile station when the enclosure is operated into the closed position.

Note that a "living hinge", as used in the context of the present invention, is a hinge integrally formed or attached to an end of each of two or more enclosure sections and about which the two enclosure sections may rotate between different configurations, typically between the open and closed configurations. In a preferred embodiment the living hinge is integrally formed with both of the enclosure sections to gain the previously mentioned advantage of efficiency in the manufacturing process. To encourage the hinge to properly flex at the desired axis, it is narrowed, necked down, or crimped at or near the axis or axes of rotation. The living hinge portion of the enclosure often, but not always, lies substantially along straight line. As in the embodiment of FIG. 4, however, the living hinge need not be continuous, and there may be a plurality of living hinges on the same enclosure, either to work in cooperation with each other or for the performance of independent functions.

Figure 5A:
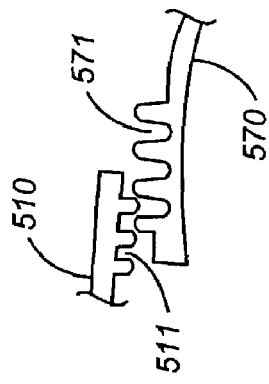
FIG. 5a is a partial cross-section of the contoured region where the front cover meets the closed intermediate cover, as taken along section line A-A in FIG. 5.
Figure 5:
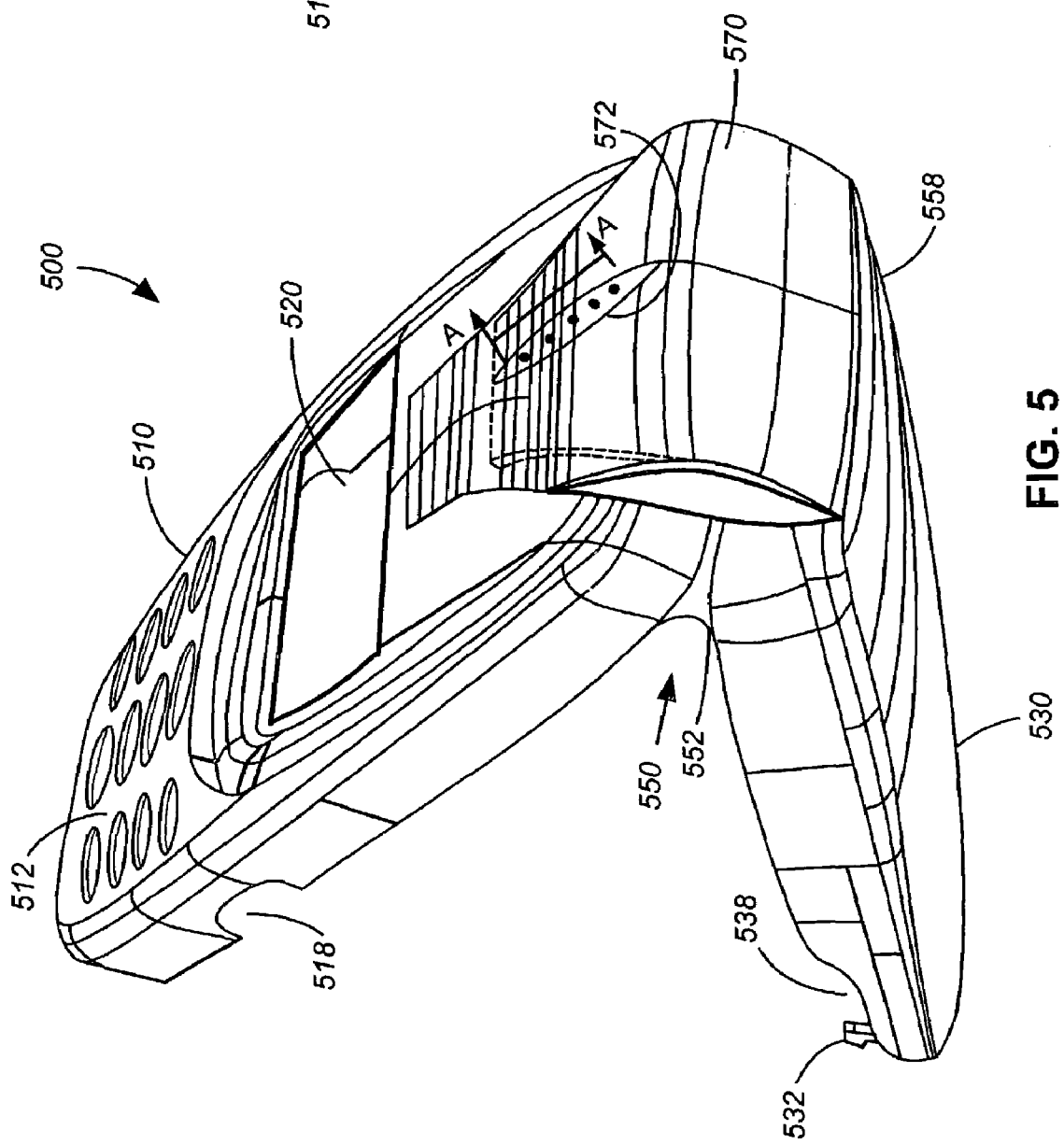
FIG. 5 is an isometric view of a mobile station enclosure according to a second embodiment of the present invention.

FIG. 5 is a mobile station enclosure 500 according to a second embodiment of the present invention. Note that in FIG. 5, as will be the case with FIGS. 6-15 that follow, many of the illustrated embodiments contain features that are equivalent to those in other embodiments. For clarity, such features will be analogously though not identically numbered. In addition, the description referring to each embodiment will focus on the embodiment's distinguishing characteristics, and features that are similar to those already described will not be called out again except for convenience or where helpful in describing the distinguishing features. Finally, it should be pointed out that these are illustrated embodiments only, and that the repeated presence or absence of a particular feature does not imply that it is a required component of the invention absent on explicit statement to that effect.

In the embodiment of FIG. 5, the intermediate cover 570 is attached to back cover 530 at living hinge 558 (similar to the embodiment of FIG. 4), but is not attached to front cover 510. Rather a contoured surface 571 on the exterior of intermediate cover 570 is shaped to engage a corresponding contoured surface 511 on the exterior of front cover 510. FIG. 5a is a partial cross-section of this region as taken along section line A-A. The exact shapes of the contoured surfaces 511 and 571 so long as they are able to engage each other to resist rotation of the intermediate cover 570 about living hinge 558. Note that in one embodiment, once the front cover 510 and the back cover 530 are closed about an internal assembly, the contoured surfaces will not allow relative movement between front cover 510 and intermediate cover 570 (under forces encountered in normal operation). In another embodiment, the intermediate cover 570 may be rotated open even when front cover 510 and back cover 530 are in a closed configuration, or as intermediate cover 570 may, in that configuration, be allowed to operate within a certain predetermined range. In this manner, the embodiment of FIG. 5 selectively permits access to the top portion of an enclosed internal assembly (not shown).

Figure 14:
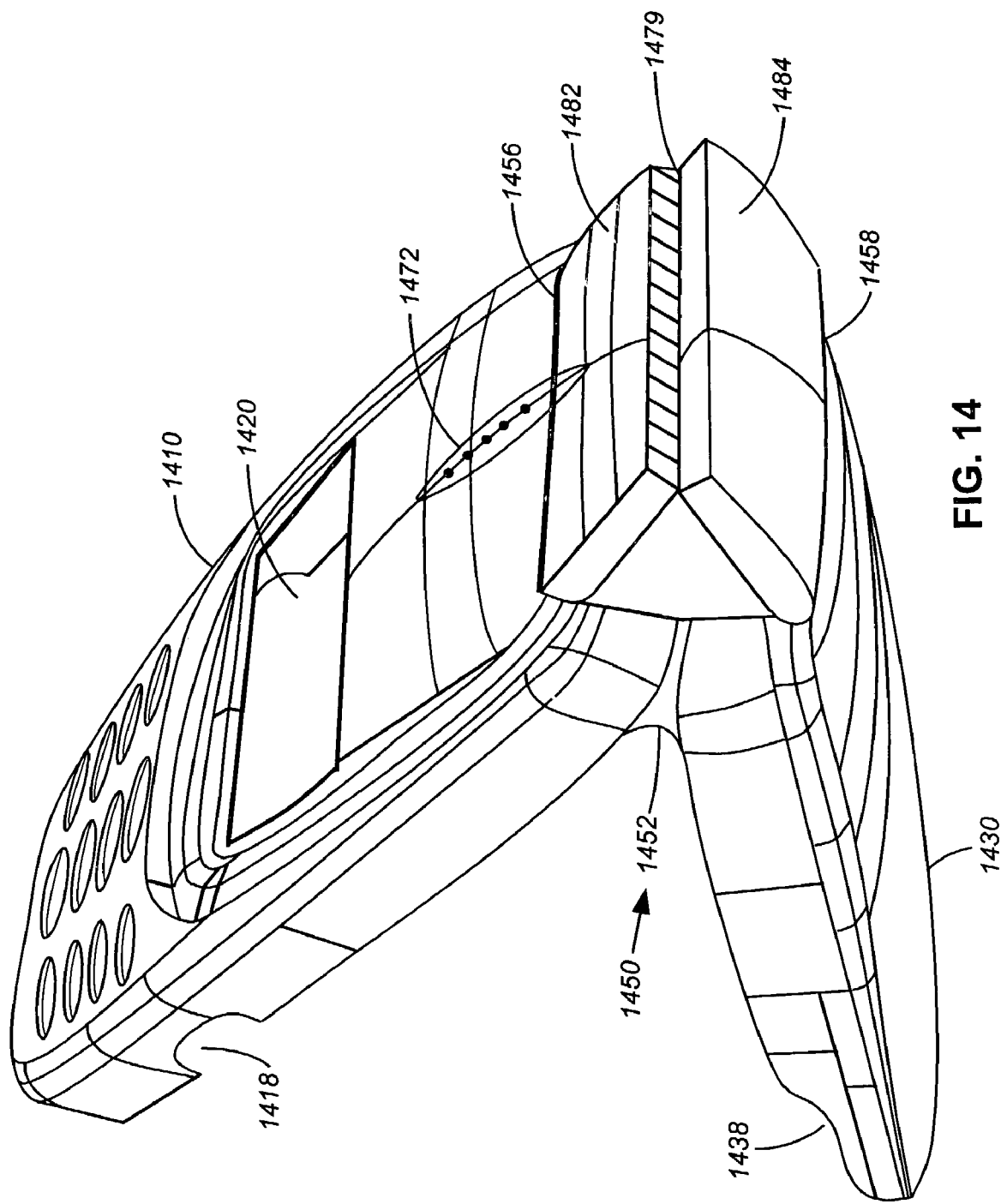
FIG. 14 is an isometric view of a mobile station enclosure according to a eleventh embodiment of the present invention.
Figure 15:
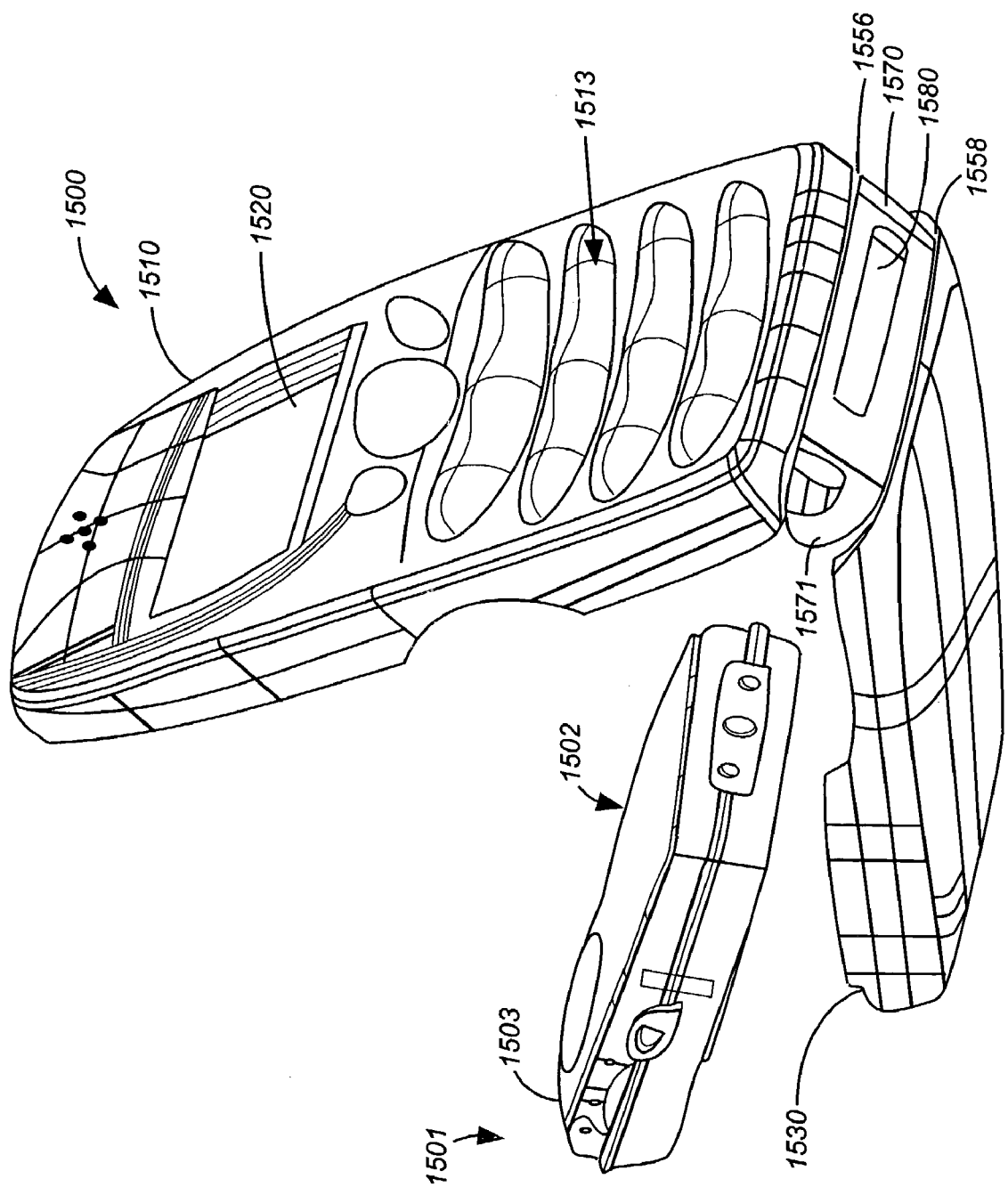
FIG. 15 is an isometric view of a mobile station enclosure according to a twelfth embodiment of the present invention.

At this point is should be noted that FIGS. 4 through 15, the enclosure will sometimes be referred to as having a top and bottom, front and back, sides and so forth. The convention adopted for use in this description is to refer to the top as that portion of the enclosure that will normally be held at the top when the user is operating the phone, such as dialing a phone number while reading the display. In FIG. 4, for example, the top of the enclosure therefore actually appears in the foreground, as it does with several of the other figures. In FIG. 15, in contrast, the bottom of the enclosure, which in that embodiment is where the front cover and back cover are joined, is in the foreground. By the same token, the front of the enclosure is the cover portion normally having the display and the keypad.

Figure 6:
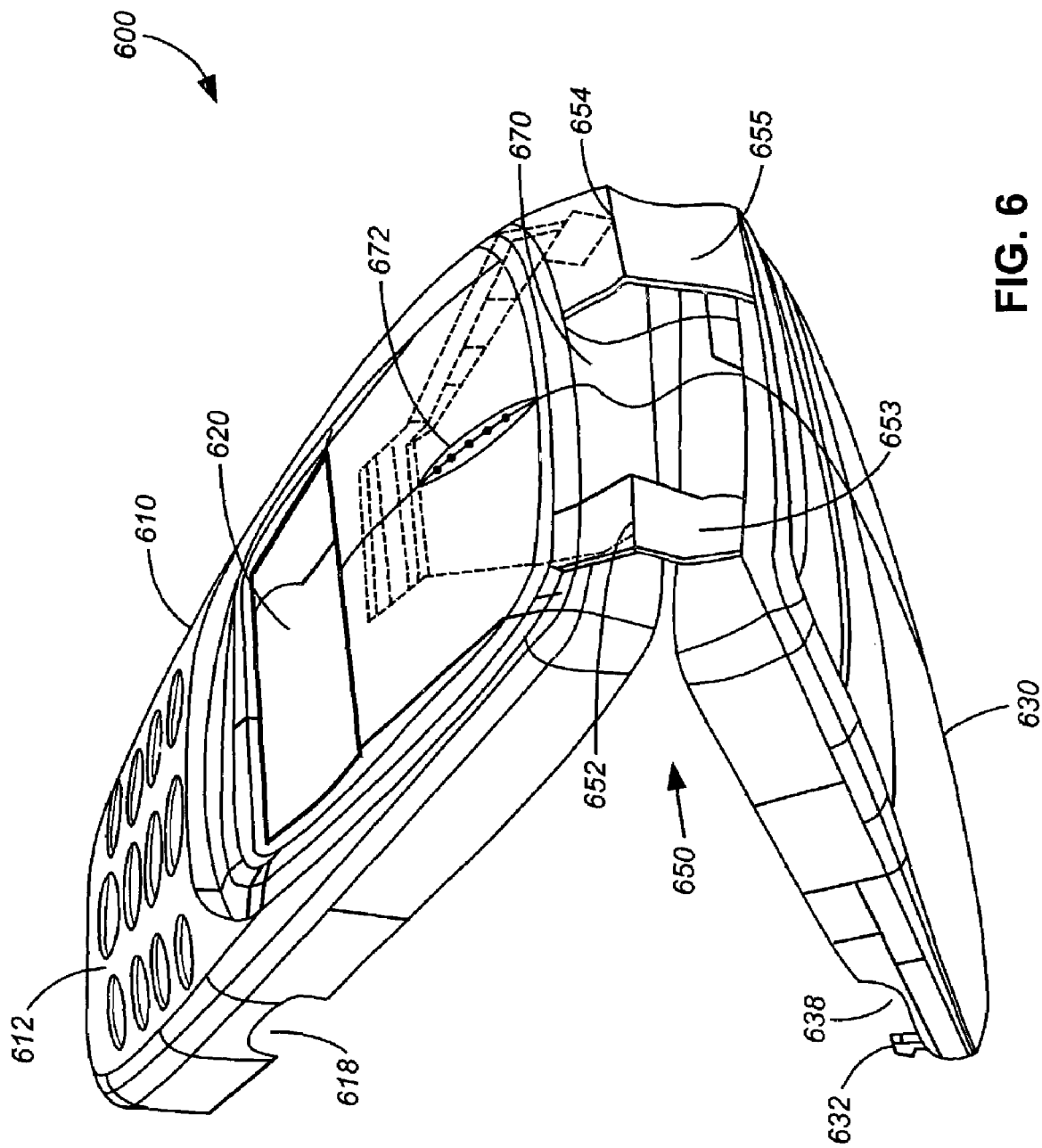
FIG. 6 is an isometric view of a mobile station enclosure according to a third embodiment of the present invention.

FIG. 6 is a mobile-station enclosure 600 according to a third embodiment of the present invention. In the embodiment of FIG. 6, living hinge 650 includes a first portion 652 and a second portion 654, formed on extension 653 and extension 655, respectively. As front cover 610 and back cover 630 are rotated into an open configuration, living hinge first portion 652 and second portion 654 are moved outwardly from the top of the enclosure.

Note that in the embodiment of FIG. 6, intermediate cover 670 may simply be a continuous piece of material attaching front cover 610 to back cover 630. In operating the enclosure from a closed configuration to an open configuration, intermediate cover 670 may flex somewhat to accommodate the movement. Alternately, of course, one or more living hinges could be used, either in the center of intermediate cover 670, or at its front and back end where it attaches to the front cover 610 and back cover 630. Note that intermediate cover 670 in this embodiment is not required.

Figure 7:
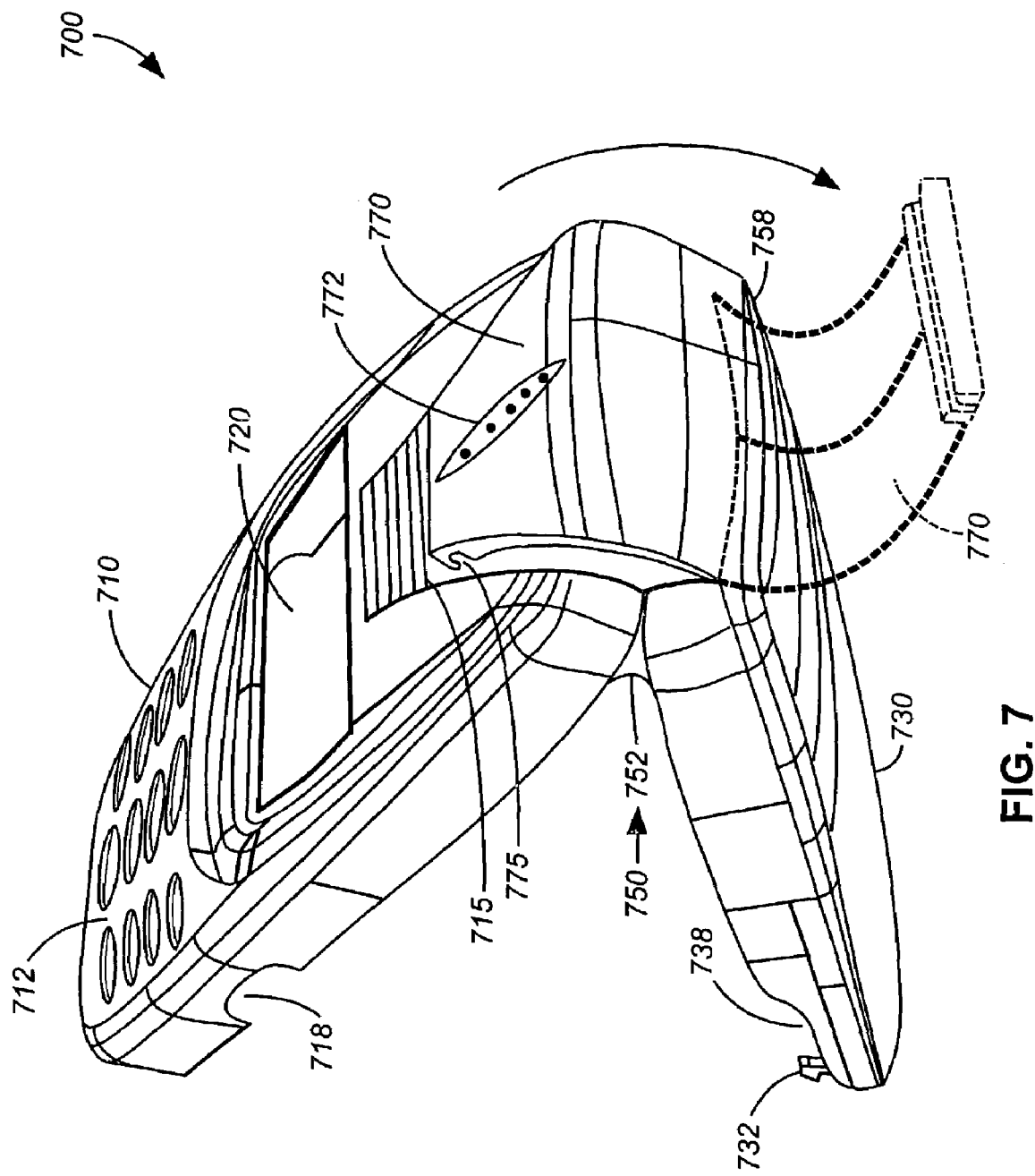
FIG. 7 is an isometric view of a mobile station enclosure according to a fourth embodiment of the present invention.

FIG. 7 is a mobile-station enclosure 700 according to a fourth embodiment of the present invention. In the embodiment of FIG. 7, living hinge 750 operates in substantially the same way as described with regard to FIGS. 4 and 5 above. Intermediate cover 770, however, is constructed so as to be operable whether or not the enclosure itself is operated into a closed configuration. (And regardless of whether an internal assembly is enclosed.) Intermediate cover 770 rotates about living hinge 758 to move from a closed to an open position. In FIG. 7, intermediate cover 770 is depicted in a nearly-closed position. From this position, it may be rotated in the direction of the arrow to an open position, as shown by the phantom portion of the drawing. When the intermediate cover is moved into a fully-closed position, it may be secured there by means of a "snap" connection. As used in this disclosure, a "snap" connection is one where snap members are formed with or attached to the components that are meant to be by the snap connected together. Corresponding snap members interlock with each other, but are shaped so that a modest force must be applied to flex or deform the members so that they may be moved into the interlocking configuration, whereupon the snap members preferably relax so that they tend to remain in the interlocked configuration until sufficient force is applied in order to separate them. In the embodiment of FIG. 7, snap member 715 is formed in front cover 710, and a corresponding pair of snap members are formed in intermediate cover 770. When the user wishes to lock intermediate cover 770 in place, sufficient force is applied to the closed (or nearly closed) intermediate cover 770 in order to cause the snap members to perform sufficiently to be brought into an interlocking configuration.

Figure 8:
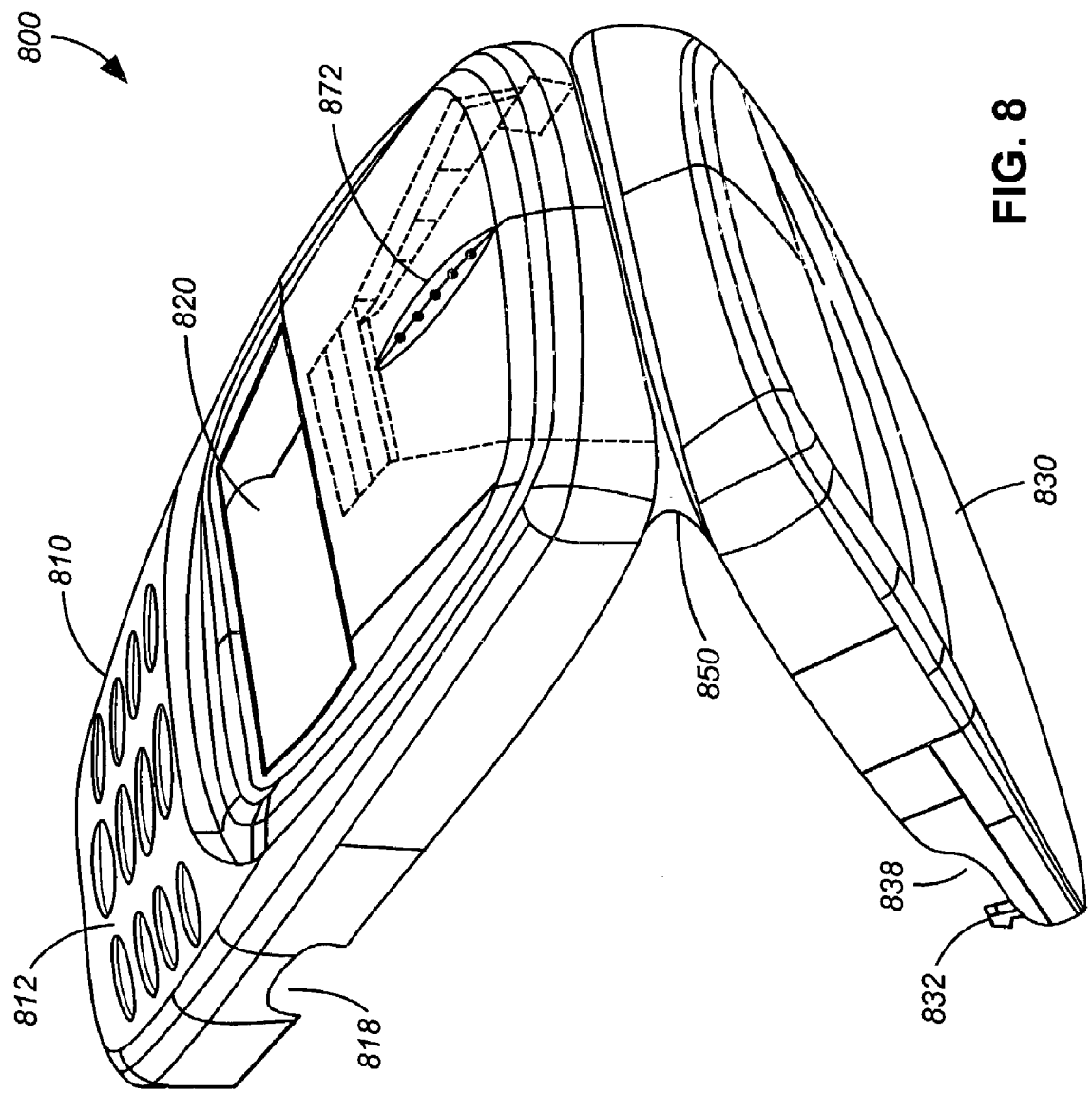
FIG. 8 is an isometric view of a mobile station enclosure according to a fifth embodiment of the present invention.

FIG. 8 is a mobile-station enclosure 800 according to a fifth embodiment of the present invention. In the embodiment of FIG. 8, front cover 810 and back cover 830 of enclosure 800 are simply joined together at living hinge 850. Once the enclosure 800 is operated into the closed configuration, the user is not provided with any access to the top of the internal assembly (not shown). If such access were necessary, of course, an opening could be formed on either side of the living hinge, that is, on the top end of front cover 810 or 830, in order to provide the necessary access. The living hinge could also be divided into two or more sections. Naturally, the plurality of openings 872 that serve as a port for the speaker are still present, although in this embodiment they are formed in front cover 810 as there is no intermediate cover.

Figure 9A:
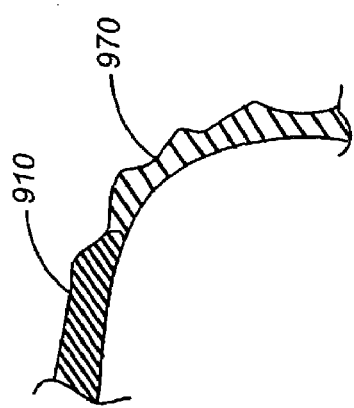
FIG. 9a is a partial cross-section of the region where the front cover meets the intermediate cover, as taken along section line A-A in FIG. 9.
Figure 9:
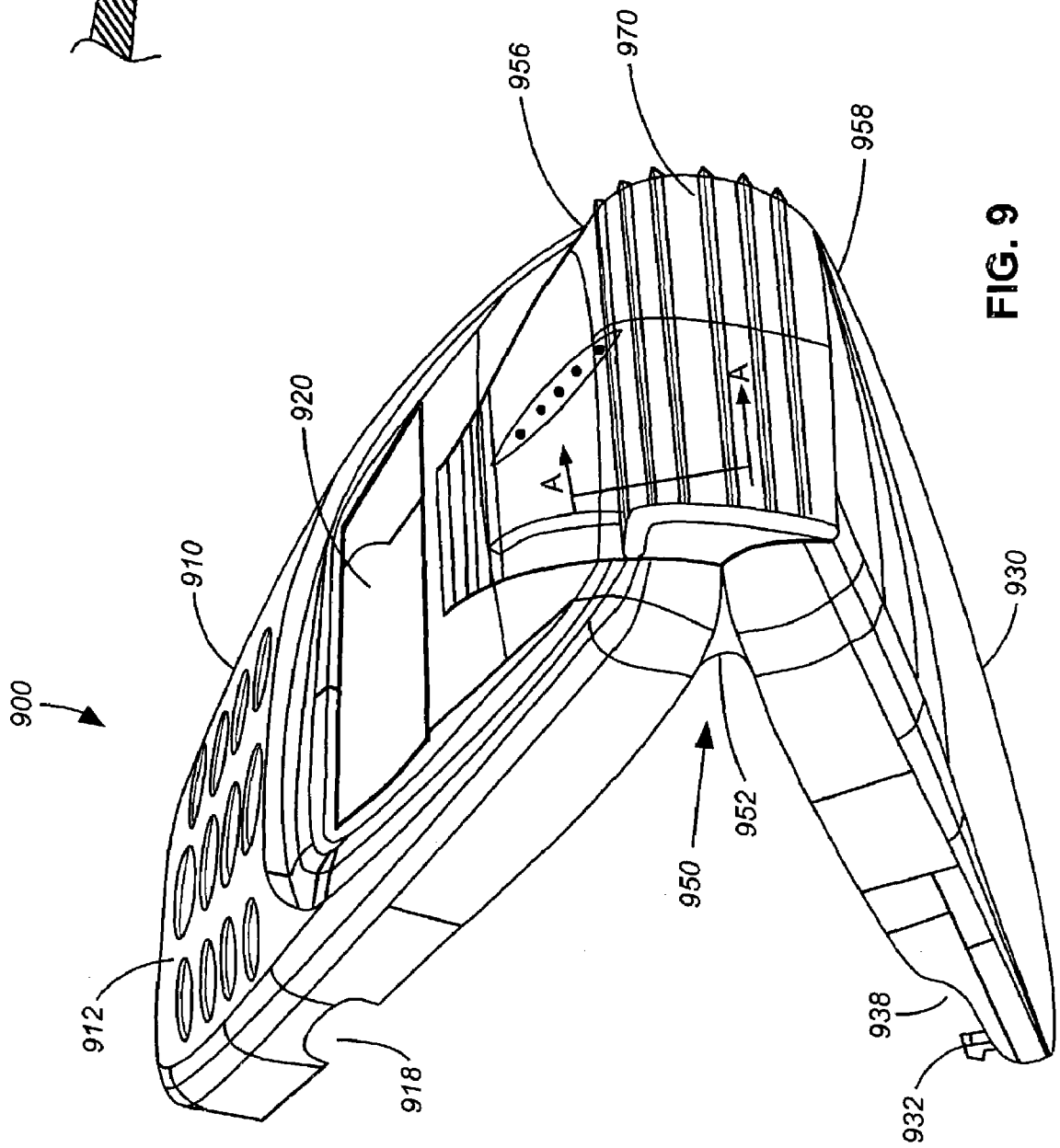
FIG. 9 is an isometric view of a mobile station enclosure according to a sixth embodiment of the present invention.

FIG. 9 is a mobile-station enclosure 900 according to a sixth embodiment of the present invention. In the embodiment of FIG. 9, an intermediate cover 970 is connected with front cover 910 of enclosure 900 via living hinge 956, and with back cover 930 via living hinge 958. Intermediate cover 970 is itself contoured in order to freely move or flex as front cover 910 and back cover 930 are operated between the open and close configuration. FIG. 9a is a partial cross-sectional view taken along section lines A-A. The contoured nature of intermediate cover 970 allows it to move and flex, although in this embodiment it will not open sufficiently to provide significant access to the top of the internal assembly (not shown). Note that in this embodiment, the intermediate cover 970 functions partially as a living hinge and partially as an intermediate cover. This dual functionality will be the case with many embodiments of the present invention, and it is in most cases unimportant to determine which of these functions predominates, or, by the same token, where living hinge ends and an intermediate (or other) cover begins.

FIG. 10 is a mobile-station enclosure 1000 according to a seventh embodiment of the present invention. In the embodiment of FIG. 10, front cover 1010 and back cover 1030 operate between the open and closed configurations about living hinge 1050 (one section of which, first portion 1052, is visible in FIG. 10. The intermediate cover 1070, however, is attached to front cover 1010 and back cover 1030 by snap connections 1076 and 1078, respectively. In this embodiment, intermediate cover 1070 may be removable, optional, or both.

As mentioned above, the enclosure of the present invention may be used with a variety of engines, or internal assemblies. Some of these internal assemblies may simply be newer models of basically the same device, but some may be designed for significantly different purposes. For example, one engine may be used for a mobile telephone while another is used for mobile game playing. The embodiment of FIG. 10 permits modification of the enclosure itself (by adding or removing the intermediate cover 1070, or by exchanging one intermediate cover for a different one) to accommodate differently designed engines. The intermediate covers 1070 may also simply be interchangeable or removable simply for aesthetic reasons, that is, to change the appearance of the enclosure and thereby of the mobile station itself. FIG. 10a is a partial cross-sectional view illustrating a snap connection as taken along section lines A-A of FIG. 10.

Figure 11B:
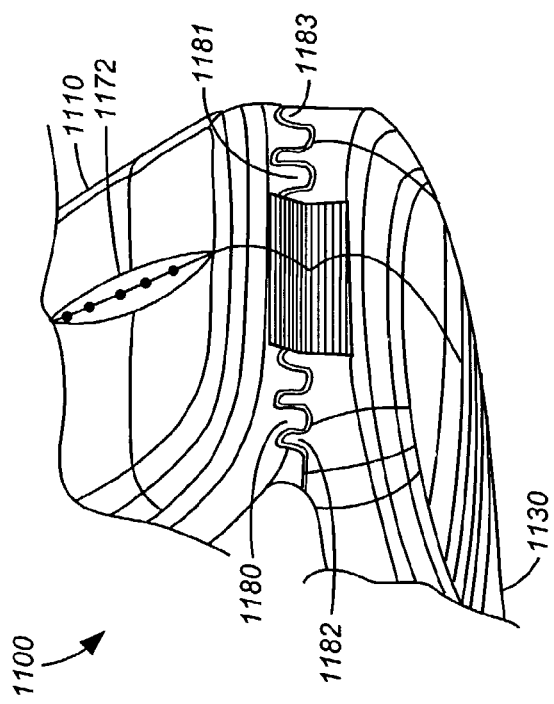
FIG. 11B is a partial isometric view showing the enclosure of FIG. 11 in an open, but not extended configuration.
Figure 11A:
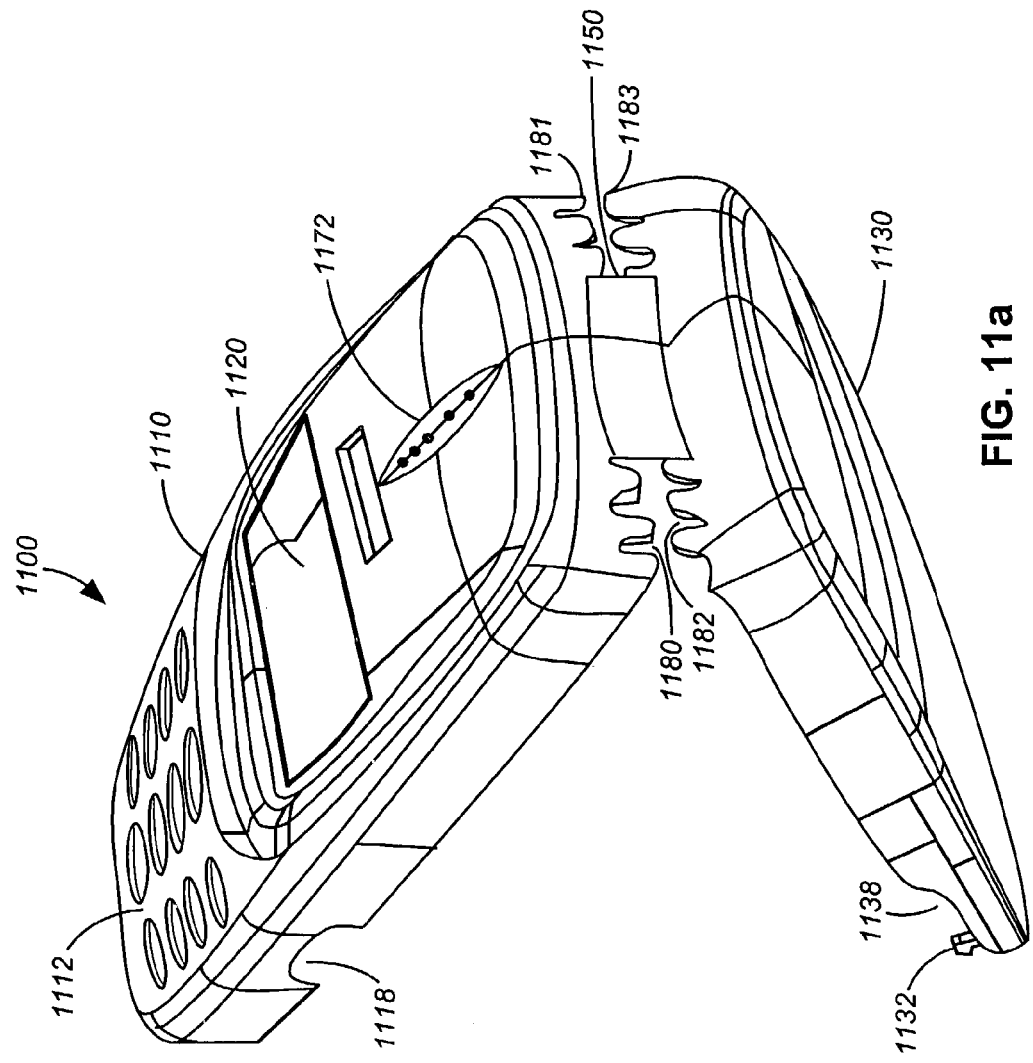
FIG. 11A is an isometric view of a mobile station enclosure having an extendable living hinge according to an eighth embodiment of the present invention.

FIG. 11A is a mobile-station enclosure 1100 according to an eighth embodiment of the present invention. As mentioned above, the living hinge connecting the front and back covers of the enclosure of the present invention is often, though not always lying along a straight line. In the embodiment of FIG. 1A, the extendable living hinge is more planar in shape, at least when extended to its full dimensions as shown in FIG. 11A. When the top ends of front cover 1110 and back cover 1130 are moved adjacent each other, snap members 1180 meet with snap members 1182, and likewise snap members 1181 meet with snap members 1183, so that the two covers may be pressed into a more stable configuration with respect to each other, as shown in FIG. 11B. In this configuration, living hinge 1150 simply flexes to accommodate the movement of the two covers toward each other, and the snap members 1180 through 1183 may actually form part of the hinge about which front cover 1110 and back cover 1130 rotate to open and close the enclosure 1100.

Figure 12A:
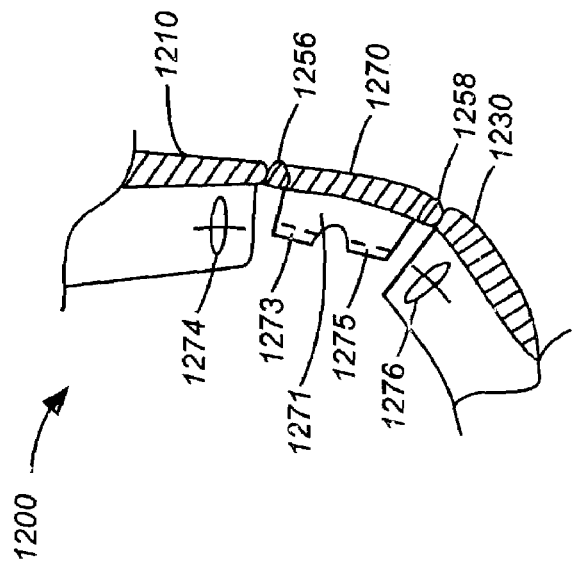
FIG. 12a is a partial side view of the internal snap assembly of the enclosure of FIG. 12, as viewed from the interior.
Figure 12:
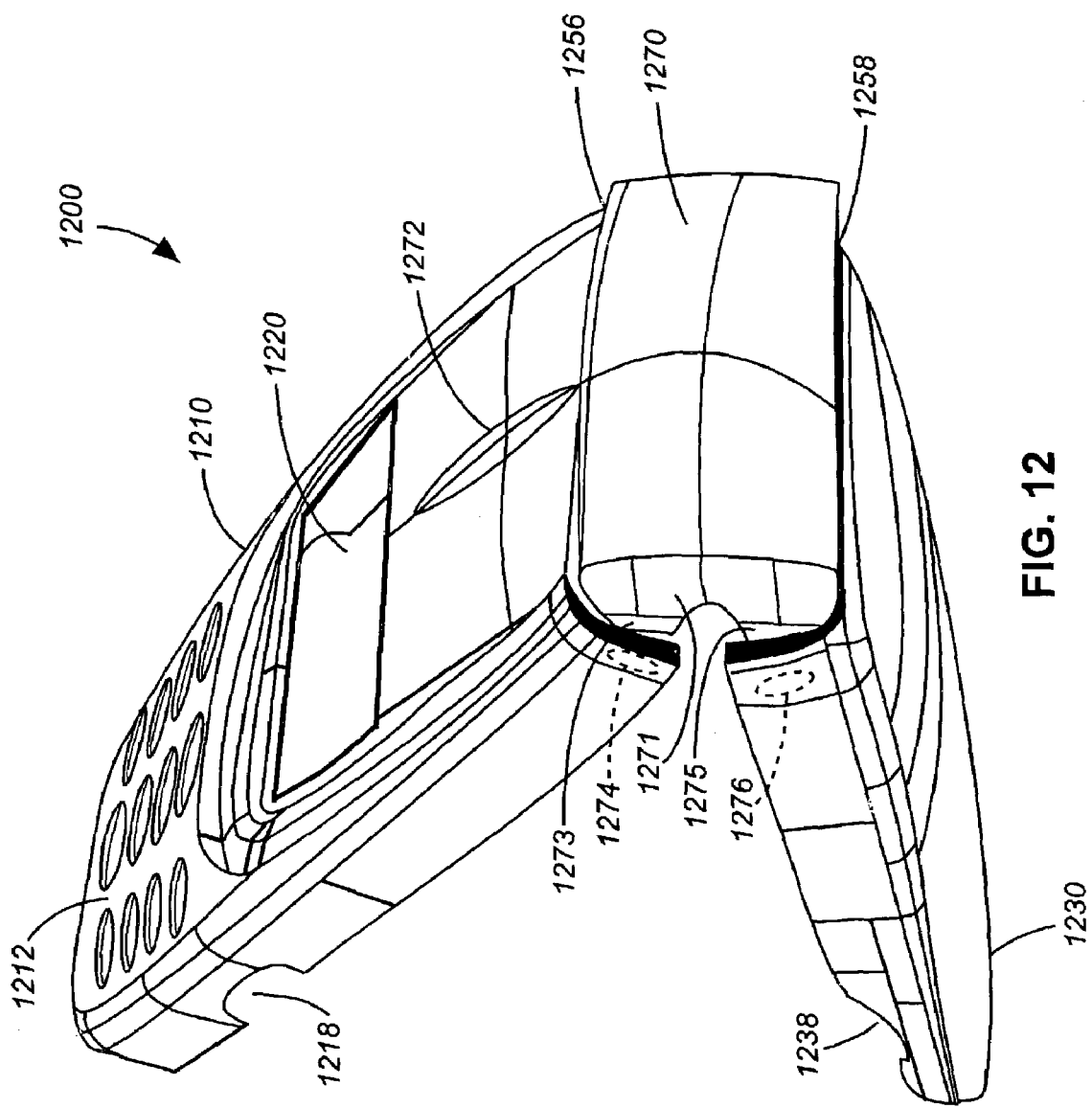
FIG. 12 is an isometric view of a mobile station enclosure according to a ninth embodiment of the present invention.

FIG. 12 is a mobile-station enclosure 1200 according to a ninth embodiment of the present invention. In the embodiment of FIG. 12, intermediate cover 1270 is attached to front cover 1210 and back cover 1230 by living hinges 1256 and 1258, respectively. In this embodiment, intermediate cover 1270 forms an extension 1271 (and a corresponding extension on the other side of intermediate cover 1270, not shown in FIG. 12). Intermediate cover extension 1271 includes raised tab portions 1273 and 1275 that are received into corresponding recesses 1274 and 1276, respectively, on the interior surface of both front cover 1210 and back cover 1230. This configuration is sometimes referred to herein as an internal snap assembly. FIG. 12a is a partial side view of these internal-snap-assembly components of enclosure 1200, as viewed from the interior.

FIG. 13 is a mobile-station enclosure 1300 according to a tenth embodiment of the present invention. In the embodiment of FIG. 13, intermediate cover 1370 forms an extension 1371 that includes an interiorly extending tab 1373. A similar extension is not shown but formed on the other side of intermediate cover 1370. Front cover 1310 forms a recess 1374 having a raised portion 1377 such that when front cover 1310 is operated into the closed configuration the inwardly extending tab is seated in the recess behind the raised portion. A recess 1376 having a raised portion 1378 formed in back cover 1330 similarly receives a portion of the tab on extension 1371. This configuration is sometimes referred to herein as an external snap assembly. In this embodiment, locking extension 1332 is also present in order to secure the enclosure into the closed configuration, although its presence is not required. FIG. 13a is a partial side view of these external-snap-assembly components of enclosure 1300, as viewed from the interior. FIG. 13b is a partial exterior side view of the external-snap-assembly components of enclosure 1300, shown in the closed configuration. In FIG. 13b, the hidden snap-assembly features have been omitted for clarity.

FIG. 14 is a mobile-station enclosure 1400 according to an eleventh embodiment of the present invention. In the embodiment of FIG. 14, intermediate cover 1470 is divided into two separate portions, first portion 1482 and second portion 1484. The two portions of intermediate cover 1470 are connected by living hinge 1479, which allows intermediate cover 1470 to "fold" when the enclosure is operated into an open configuration. Note that there could be additional portions connected together in similar fashion.

FIG. 15 is a mobile-station enclosure 1500 according to a twelfth embodiment of the present invention. In the embodiment of FIG. 15, intermediate cover 1570 is located at the bottom end of the enclosure 1500. As with intermediate covers located at the top end, intermediate cover 1570 is attached to front cover 1510 by living hinge 1556 and to back cover 1530 by living hinge 1558. Intermediate cover 1570 forms an opening 1580 through which, for example, the power and external-device ports of internal assembly 1501 may be accessed. In FIG. 15, internal assembly 1501 is shown being received into the enclosure 1500, but not yet fully installed. Extension 1571 formed on intermediate cover 1570 may form a snap assembly (not show) if desired.

Also illustrated in FIG. 15 is the use of an integrated keypad 1513. In contrast to a series of openings for providing access to a plurality of existing keys, integrated keypad 1513 is integrally formed with the enclosure 1500 itself. This feature may be used with an existing keymat (for example keymat 320 shown in FIG. 3), in which case the variously formed keys simply indicate the location that a user must depress to operate a given key. Preferably, however, an interior keymat is not needed, and the individually formed keys of integrated keypad 1513 are associated with inward extensions (not shown) that are received into key openings 1502 in the chassis faceplate 1503 of internal assembly 1501. When the user presses any of such keys, the actuating force is then transferred through the inward extension to the contact sheet (also not shown), making the appropriate key-switch connection.

The preferred descriptions are of preferred examples for implementing the invention, and the scope of the invention should not necessarily be limited by this description. The scope of the present invention is defined by the following claims.

What is claimed is:

1. An enclosure for a mobile station having an internal assembly, said enclosure comprising:
    a front cover configured to allow interaction with the internal assembly;
    a back cover; and
    a living hinge connected to at least one of the front cover and the back cover such that the front cover and back cover of the enclosure are operable to rotate about the hinge between an open configuration for receiving the internal assembly and a closed position for securely retaining the internal assembly after receipt and allowing interaction with the internal assembly via at least the front cover to operate the mobile station.

2. The enclosure of claim 1, further comprising an intermediate cover attached to the enclosure.

3. The enclosure of claim 2, wherein the intermediate cover is attached to the back cover of the enclosure.

4. The enclosure of claim 2, wherein the intermediate cover is attached to the front cover and the back cover of the enclosure.

5. The enclosure of claim 2, wherein the intermediate cover is integrally formed with the enclosure.

6. The enclosure of claim 5, further comprising at least one living hinge formed between the enclosure and the intermediate cover.

7. The enclosure of claim 2, wherein the intermediate cover has a contoured surface for interlocking with a corresponding interlocking surface located on another cover of the enclosure.

8. The enclosure of claim 2, where in the intermediate cover is removably attachable to at least one other cover of the enclosure.

9. The enclosure of claim 8, wherein the intermediate cover is removably attached using a snap connection.

10. The enclosure of claim 2, further comprising an internal snap assembly.

11. The enclosure of claim 2, further comprising an external snap assembly.

12. The enclosure of claim 2, wherein the intermediate cover forms an opening for providing access to the internal assembly when it is secured within the enclosure.

13. The enclosure of claim 2, wherein the intermediate cover is contoured.

14. The enclosure of claim 2, wherein the intermediate cover is expandable.

15. The enclosure of claim 2, wherein the intermediate cover is divided by at least one living hinge such that it can fold when the enclosure is opened.

16. The enclosure of claim 1, wherein the front cover forms an integrated keypad.

17. The enclosure of claim 1, wherein the internal assembly includes a display, and wherein the front cover forms a transparent window pane though which the display may be viewed when the internal assembly is secured within the enclosure.

18. The enclosure of claim 1, wherein the living hinge is integrally formed with at least one of the front cover and the back cover.

19. The enclosure of claim 1, wherein the living hinge is integrally formed with the front cover and with the back cover.

20. A mobile station comprising:
    an internal assembly comprising operational components of the mobile station; and
    an enclosure, the enclosure comprising a front cover and a back cover joined by a living hinge about which the enclosure may open to receive the internal assembly and close to securely contain the internal assembly after receipt and to allow interaction with the internal assembly via the enclosure to operate the mobile station.

21. The mobile station of claim 20, wherein the living hinge is discontinuous.

22. The mobile station of claim 20, wherein the enclosure further comprises an intermediate cover attached to at least one of the other enclosure covers.

23. The mobile station of claim 20, wherein the enclosure front cover forms an integrated keypad.

24. The mobile station of claim 20, further comprising a keymat.

25. The mobile station of claim 20, further comprising at least one spacer disposed near the external assembly to restrict its undesirable movement.

* * * * *